United States Patent
Jeong et al.

(10) Patent No.: US 10,152,829 B2
(45) Date of Patent: Dec. 11, 2018

(54) VIRTUAL FITTING DEVICE AND VIRTUAL FITTING METHOD THEREOF

(71) Applicant: SAMSUNG ELECTRONICS CO., LTD., Suwon-si, Gyeonggi-do (KR)

(72) Inventors: Ji-won Jeong, Suwon-si (KR); Do-kyoon Kim, Seongnam-si (KR); Eun-jung Ju, Seoul (KR); Young-min Kwak, Suwon-si (KR); Seung-ho Shin, Suwon-si (KR); Sun-young Han, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/521,035

(22) PCT Filed: Oct. 12, 2015

(86) PCT No.: PCT/KR2015/010701
§ 371 (c)(1),
(2) Date: Apr. 21, 2017

(87) PCT Pub. No.: WO2016/064121
PCT Pub. Date: Apr. 28, 2016

(65) Prior Publication Data
US 2017/0316617 A1    Nov. 2, 2017

(30) Foreign Application Priority Data
Oct. 21, 2014    (KR) .................. 10-2014-0142363

(51) Int. Cl.
G06T 15/00    (2011.01)
G06T 19/20    (2011.01)
(Continued)

(52) U.S. Cl.
CPC ......... *G06T 19/20* (2013.01); *G06Q 30/0643* (2013.01); *G06T 7/74* (2017.01);
(Continued)

(58) Field of Classification Search
CPC . G06T 2207/20221; G06T 2207/30196; G06T 2210/16; G06T 2219/2004;
(Continued)

(56) References Cited

U.S. PATENT DOCUMENTS 5,937,081 A    8/1999    O'Brill et al.
6,810,300 B1   10/2004   Woltman et al.
(Continued)

FOREIGN PATENT DOCUMENTS

EP    2 372 653    10/2011
GB    2488237      8/2012
(Continued)

OTHER PUBLICATIONS

International Search Report for PCT/KR2015/010701, dated Jan. 19, 2016, 4 pages.
(Continued)

*Primary Examiner* — Phu K Nguyen
(74) *Attorney, Agent, or Firm* — Nixon & Vanderhye, P.C.

(57) ABSTRACT

Provided are a virtual fitting device and a virtual fitting method thereof. The virtual fitting method includes acquiring a live video by photographing a user, acquiring a virtual video which includes an avatar corresponding to the user based on a body shape and a movement of the user, determining each composition area of the live video and the virtual video by analyzing the live video and the virtual video, and outputting a virtual fitting video by composing the composition area of the live video and the composition area of the virtual video.

13 Claims, 17 Drawing Sheets

(51) Int. Cl.
*G06T 7/73* (2017.01)
*G06T 13/40* (2011.01)
*G06Q 30/06* (2012.01)

(52) U.S. Cl.
CPC .... *G06T 13/40* (2013.01); *G06T 2207/10016* (2013.01); *G06T 2207/20221* (2013.01); *G06T 2207/30196* (2013.01); *G06T 2210/16* (2013.01); *G06T 2219/2004* (2013.01)

(58) Field of Classification Search
CPC ........... G06T 19/20; G06T 13/40; G06T 7/74; G06T 2207/10016
USPC ......................................................... 345/418
See application file for complete search history.

(56) References Cited

U.S. PATENT DOCUMENTS

| | | | |
|---|---|---|---|
| 8,275,590 | B2 | 9/2012 | Szymczyk et al. |
| 8,355,811 | B2 | 1/2013 | Isogai et al. |
| 8,364,561 | B2 * | 1/2013 | Wolper ............... G06T 17/00 |
| | | | 700/132 |
| 8,380,586 | B2 * | 2/2013 | Paolini ............... G06Q 10/0637 |
| | | | 705/26.7 |
| 8,436,861 | B1 | 5/2013 | Baraff |
| 9,607,419 | B2 * | 3/2017 | Kim ........................ G06T 13/40 |
| 9,665,906 | B2 * | 5/2017 | Adeyoola ............. G06T 19/006 |
| 2007/0130020 | A1 | 6/2007 | Paolini |
| 2011/0279475 | A1 * | 11/2011 | Ikenoue ............... G06K 9/6204 |
| | | | 345/619 |
| 2011/0298897 | A1 | 12/2011 | Sareen et al. |
| 2012/0086783 | A1 * | 4/2012 | Sareen .................. G06N 3/006 |
| | | | 348/47 |
| 2012/0218262 | A1 * | 8/2012 | Yomdin ................. G06T 13/40 |
| | | | 345/419 |
| 2012/0299912 | A1 | 11/2012 | Kapur et al. |
| 2014/0168217 | A1 | 6/2014 | Kim et al. |
| 2016/0275693 | A1 | 9/2016 | Black et al. |

FOREIGN PATENT DOCUMENTS

| | | |
|---|---|---|
| JP | H10-340282 | 12/1998 |
| JP | H11-205585 | 7/1999 |
| JP | 2007-102478 | 4/2007 |
| JP | 2011-209887 | 10/2011 |
| JP | 2013-190974 | 9/2013 |
| JP | 2014-093052 | 5/2014 |
| KR | 10-2002-0051667 | 6/2002 |
| KR | 10-2006-0108271 | 10/2006 |
| KR | 10-2009-0054779 | 6/2009 |
| KR | 10-2009-0058765 | 6/2009 |
| KR | 10-2010-0135001 | * 12/2010 |
| KR | 10-2013-0082709 | 7/2013 |
| KR | 10-2014-0077820 | 6/2014 |
| WO | WO 2014/081394 | 5/2014 |

OTHER PUBLICATIONS

Written Opinion of the ISA for PCT/KR2015/010701, dated Jan. 19, 2016, 5 pages, with English-Language Translation (6 pages).
Extended Search Report dated Feb. 8, 2018 in counterpart European Patent Application No. 15851874.6.

* cited by examiner

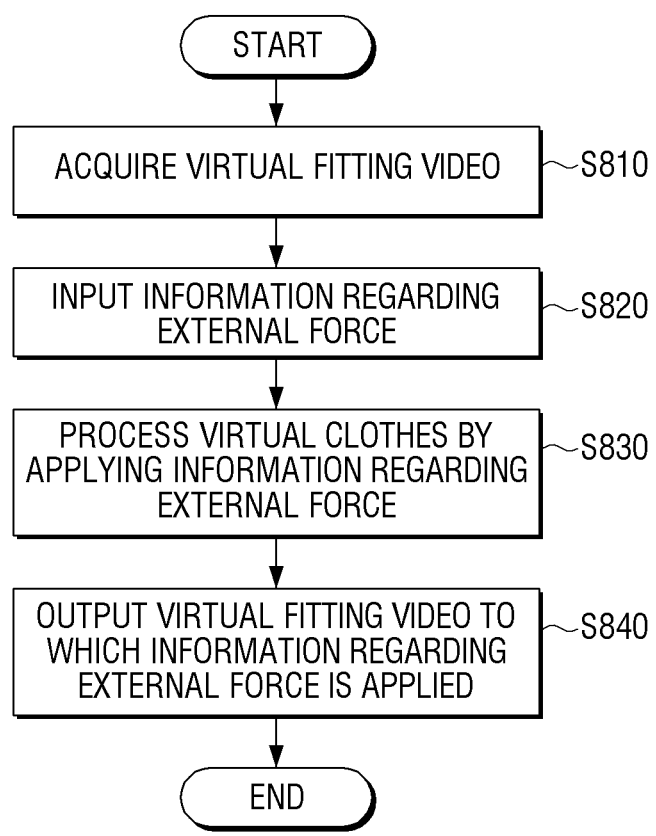

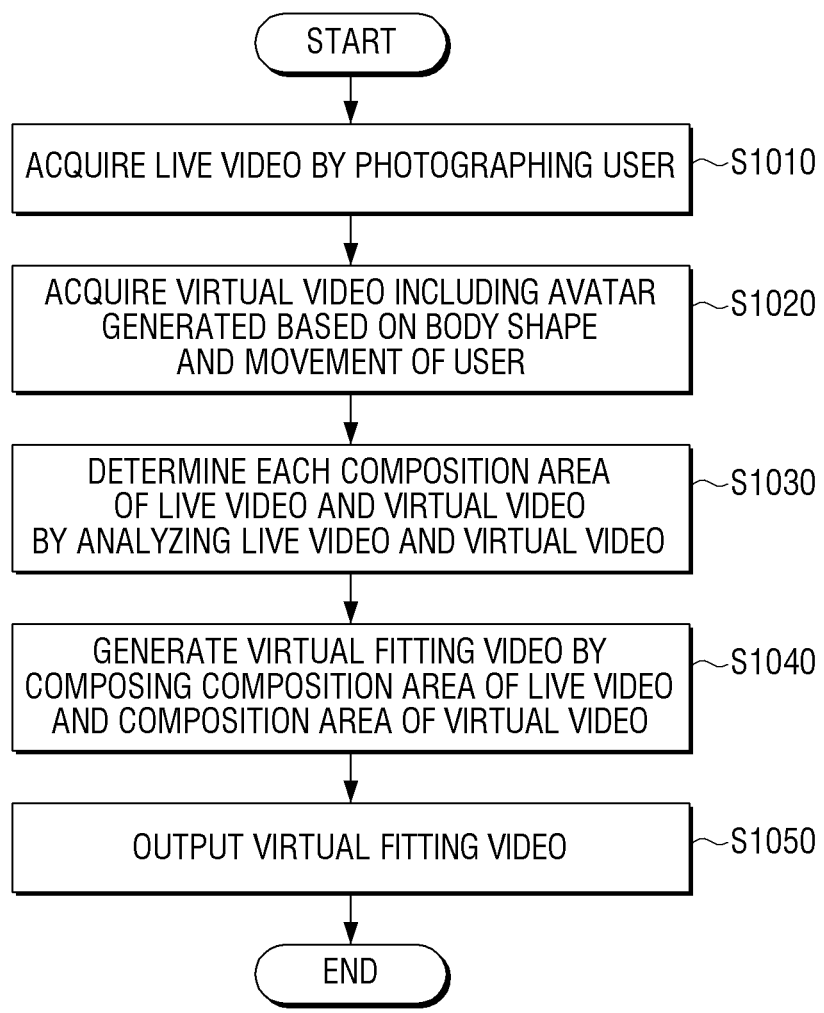

VIRTUAL FITTING DEVICE AND VIRTUAL FITTING METHOD THEREOF

This application is the U.S. national phase of International Application No. PCT/KR2015/010701 filed 12 Oct. 2015, which designated the U.S. and claims priority to KR Patent Application No. 10-2014-0142363 filed 21 Oct. 2014, the entire contents of each of which are hereby incorporated by reference.

FIELD

Devices and methods consistent with exemplary embodiments relate to a virtual fitting device and a virtual fitting method thereof, and more particularly, to a virtual fitting device which provides a substantial virtual fitting experience to a user by composing a live video and a virtual video and a virtual fitting method thereof.

TECHNICAL FIELD

Recently, virtual reality contents are rising as contents for coming generation. Specially, interests of each enterprise and each consumer in virtual fitting—clothing an avatar which corresponds to a consumer in virtual clothes in a virtual space and purchasing clothes—are increasing.

Meanwhile, one of key points in the virtual fittings is that the feel that a user would feel when he/she actually wears clothes should be reproduced when an avatar wears the clothes in a virtual space. Specifically, if clothes are uncomfortable when a person wears the clothes or if it is uncomfortable for the person to move with the clothes should be checked in a virtual space in addition to whether color and a design of the clothes fit the person. A virtual fitting which cannot provide aforementioned experiences has a problem. The virtual fitting only makes people to experience new technology and cannot provide a service which leads to a purchase which is the main purpose.

To resolve the problem, a virtual fitting should be able to reflect atmosphere and actual user image and provide fitting feeling which shows how much clothes worn in a virtual space actually fit a body of a user.

To provide a virtual fitting, the Augmented Reality (AR) method and the Virtual Reality (VR) method are used. The AR method includes acquiring a live video including a body shape and a movement of a user from a camera, separating the user, modifying a size and an image of virtual clothes with respect to the separated user image and overlapping and composing the clothes of which size and image are modified. The VR method includes acquiring a video including a body shape and a movement of a user from a camera, generating an avatar with the same body shape as the user, clothing the avatar in virtual clothes and displaying the clothed avatar.

However, with the AR method, a natural image is displayed because a user is reflected as he/she is but it is impossible to provide fitting feeling which is about how much clothes worn in a virtual space fit a body of the user because the AR method just relates to a method of simply overlapping virtual clothes on the user image. In addition, there is a problem that actual clothes worn by the user overlap the virtual clothes because the actual clothes cannot be removed in a live video. For example, if a user who is wearing a long-sleeve shirt selects a short-sleeve shirt or a sleeveless shirt, the actual long-sleeve shirt is displayed as it is and it may look awkward in a virtual space.

With the VR method, fitting feeling which is about how much virtual clothes fit a body of a user can be exactly provided because an avatar with the same body shape as the user is used and the VR method has an advantage of displaying images that the avatar in the virtual clothes moves by applying various pre-defined motions such as cat walking on a runway and playing basketball. However, there is a problem that the user does not feel the avatar as himself/herself because of the limitation on the rendering technology and the three-dimensional (3D) shape capturing technology.

DETAILED DESCRIPTION OF THE INVENTION

Problem to be Solved

The present invention is derived to resolve the aforementioned problems and the object of the present invention is to provide a virtual fitting device which provides a user with a virtual fitting video which is more substantial and with fitting feeling by composing a live video of the AR method and a virtual video of the VR method when the user experiences the virtual fitting and a virtual fitting method thereof.

Means of Solving the Problem

According to an aspect of an exemplary embodiment, a virtual fitting method, including: acquiring a live video by photographing a user; acquiring a virtual video which includes an avatar corresponding to the user based on a body shape and a movement of the user; determining each composition area of the live video and the virtual video by analyzing the live video and the virtual video; and outputting a virtual fitting video by composing the composition area of the live video and the composition area of the virtual video.

The determining may include identifying an area where actual clothes that the user actually wears are positioned by analyzing the live video, determining an area where virtual clothes that the avatar wears are positioned by analyzing the virtual video, and determining each composition area of the live video and the virtual video by comparing the area where the actual clothes are positioned and the area where the virtual clothes are positioned.

The determining each composition area may include determining an area where the actual clothes are positioned as a composition area of the virtual video, determining an area where the virtual clothes are positioned among areas where the actual clothes are not positioned as a composition area of the virtual video, and determining an area where the actual clothes and the virtual clothes are not positioned as a composition area of the live video.

The virtual fitting method may further include: receiving a user command to select one of actual accessories or one of virtual accessories; and in response to the one of actual accessories being selected, determining a certain area which includes an area where the one of actual accessories is positioned as a composition area of the live video and in response to the one of virtual accessories being selected, determining a certain area which includes an area where the one of virtual accessories is positioned as a composition area of the virtual video.

The acquiring the live video may include acquiring the live video by photographing the user by using a video camera, and the acquiring the virtual video may include photographing the body shape and the movement of the user by using a depth camera or a video camera and acquiring a virtual video by generating an avatar based on the photographed body shape and the photographed movement of the user.

The outputting may include generating the virtual fitting video by reflecting characteristic information of virtual clothes that the user wants to wear.

The generating may include: in response to a movement of the user, determining an extent of stretchiness of the virtual clothes with respect to the movement of the user based on the characteristic information of the virtual clothes; and in response to the extent of stretchiness of the virtual clothes being equal to or greater than a predetermined threshold value, stopping a movement of a user image which is included in the virtual fitting video or controlling a speed of the movement of the user image.

The generating may include: in response to a movement of the user, determining a body shape change of the user; and generating the virtual fitting video based on the characteristic information of the virtual clothes and the body shape change of the user.

The generating may include: receiving information regarding external force; and generating the virtual fitting video based on the characteristic information of the virtual clothes and the information regarding the external force.

The generating may include generating the virtual fitting video by displaying a main point of the virtual clothes based on information regarding the main point of the virtual clothes.

According to an aspect of another exemplary embodiment, a virtual fitting device, includes: a live video acquiring unit configured to acquire a live video of a user by photographing the user; a virtual video acquiring unit configured to acquire a virtual video including an avatar corresponding to the user based on a body shape and a movement of the user; a determination unit configured to determine each composition area of the live video and the virtual video by analyzing the live video and the virtual video; a generator configured to generate a virtual fitting video by composing the composition area of the live video and the composition area of the virtual video; and an outputter configured to output the virtual fitting video.

The determination unit may identify an area where actual clothes that the user actually wears are positioned by analyzing the live video, determine an area where virtual clothes that the avatar wears are positioned by analyzing the virtual video, and determine each composition area of the live video and the virtual video by comparing the area where the actual clothes are positioned and the area where the virtual clothes are positioned.

The determination unit may determine an area where the actual clothes are positioned as a composition area of the virtual video, determine an area where the virtual clothes are positioned among areas where the actual clothes are not positioned as a composition area of the virtual video, and determine an area where the actual clothes and the virtual clothes are not positioned as a composition area of the live video.

The virtual fitting device may further include an receiver configured to receive a user command to select one of actual accessories or one of virtual accessories and, in response to the one of actual accessories being selected, the determination unit may determine a certain area which includes an area where the one of actual accessories is positioned as a composition area of the live video and in response to the one of virtual accessories being selected, determine a certain area which includes an area where the one of virtual accessories is positioned as a composition area of the virtual video.

The live video acquiring unit may acquire the live video by photographing the user by using a video camera, and the virtual video acquiring unit may include photographing the body shape and the movement of the user by using a depth camera or a video camera and acquiring a virtual video by generating an avatar based on the photographed body shape and the photographed movement of the user.

The generator may generate the virtual fitting video by reflecting characteristic information of virtual clothes that the user wants to wear.

The generator may, in response to a movement of the user, determine an extent of stretchiness of the virtual clothes with respect to the movement of the user based on the characteristic information of the virtual clothes and in response to the extent of stretchiness of the virtual clothes being equal to or greater than a predetermined threshold value, stop a movement of a user image which is included in the virtual fitting video or control a speed of the movement of the user image.

The generator may, in response to a movement of the user, determine a body shape change of the user and generate the virtual fitting video based on the characteristic information of the virtual clothes and the body shape change of the user.

The generator may, in response to receiving information regarding external force, generate the virtual fitting video based on the characteristic information of the virtual clothes and the information regarding the external force.

The generator may generate the virtual fitting video by displaying a point where a main point of the virtual clothes and a user image match based on information on the main point of the virtual clothes.

Effect of the Invention

According to the various exemplary embodiments of the present invention, a user may choose clothes which fit him/her well by experiencing a virtual fitting which is more substantial and with fitting feeling without actually wearing the clothes.

THE BRIEF DESCRIPTION OF THE DRAWINGS

FIGS. 6A, 6B, 7A, 7B, 8, 9A and 9B are views illustrating methods of processing a virtual fitting video by using characteristic information of virtual clothes or information regarding external force according to various exemplary embodiments; and FIG. 10 is a flowchart illustrating a virtual fitting method according to an exemplary embodiment.

DETAILED DESCRIPTION OF THE EXEMPLARY EMBODIMENTS

Figure 1:
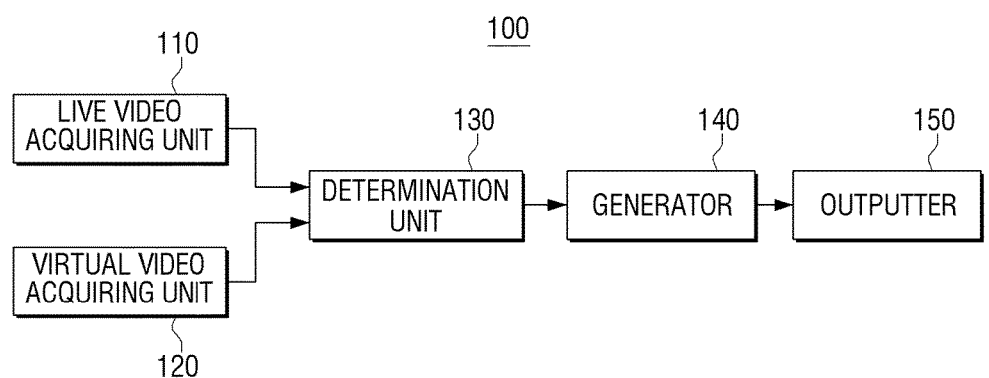
FIG. 1 is a block diagram illustrating a configuration of a virtual fitting device according to an exemplary embodiment.

The exemplary embodiments may have a variety of modifications and several embodiments. Accordingly, specific exemplary embodiments will be illustrated in the drawings and described in detail in the detailed description part. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms are used only for the purpose of distinguishing one element from another.

The terms used in the present disclosure are provided to merely explain specific exemplary embodiment and are not intended to limit the scope of rights. A singular expression includes a plural expression, unless otherwise specified. The terms, "include," "comprise," "is configured to," etc. of the description are used to indicate that there are features, numbers, steps, operations, elements, parts or combination thereof, and they should not exclude the possibilities of combination or addition of one or more features, numbers, steps, operations, elements, parts or combination thereof.

In an example embodiment, "a module" or "a unit" performs at least one function or operation, and may be realized as hardware, software, or combination thereof. In addition, a plurality of "modules" or "units" may be integrated into at least one module and may be realized as at least one process or processor (not shown) except for "modules" or "units" that should be realized in specific hardware.

Certain aspects of an exemplary embodiment will now be described in greater detail with reference to the accompanying drawings. FIG. 1 is a block diagram illustrating a configuration of a virtual fitting device 100 according to an exemplary embodiment. FIG. 1 illustrates that the virtual fitting device 100 includes a live video acquiring unit 110, a virtual video acquiring unit 120, a determination unit 130, a generator 140 and an outputter 150.

The live video acquiring unit 110 acquires a live video by photographing a user with a video camera. Herein, the live video acquiring unit 110 may acquire a live video by photographing the entire body of the user but it only pertains to an exemplary embodiment. A live video may be acquired by photographing only the upper body of the user.

The virtual video acquiring unit 120 acquires a virtual video including an avatar corresponding to the user based on a body shape and a movement of the user. Herein, the avatar corresponding to the user may wear virtual clothes that the user wants to try. Detailed explanations regarding the virtual video acquiring unit 120 will be described with reference to FIG. 2 hereinafter.

Figure 2:
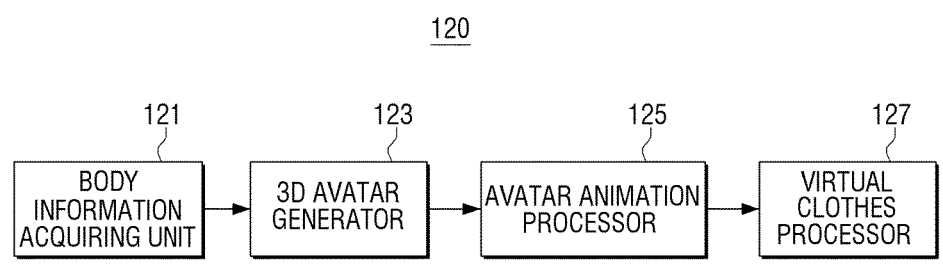
FIG. 2 is a block diagram illustrating a configuration of a virtual video acquiring unit according to an exemplary embodiment.

FIG. 2 illustrates that the virtual video acquiring unit 120 includes a body information acquiring unit 121, a 3D avatar generator 123, an avatar animation processor 125 and a virtual clothes processor 127.

The body information acquiring unit 121 acquires body shape information and movement information of a user based on depth information acquired by using a depth camera. Specifically, the body information acquiring unit 121 may acquire body shape information of the user by automatically calculating sizes of the user's body from a depth image acquired from the depth camera. In addition, the body information acquiring unit 121 may acquire movement information of the user based on a movement in the user image included in the depth image.

Meanwhile, the depth information may be acquired by using the depth camera but it only pertains to an exemplary embodiment. The depth information may be acquired by analyzing a live video acquired by a video camera.

The 3D avatar generator 123 generates a 3D avatar based on body shape information acquired through the body information acquiring unit 121. Specifically, the 3D avatar generator 123 may generate an avatar through a customizing method based on a main body size by applying body shape information to a standard avatar and generate an avatar by directly applying the acquired body shape information to an avatar model which can be modified.

In addition, if a user is a pre-registered user, the 3D avatar generator 123 may generate an avatar by loading the avatar which corresponds to the pre-registered user.

The avatar animation unit 125 may process an avatar by reflecting a movement of a user or by a pre-registered avatar motion. The avatar animation processor 125 may identify a certain posture of the avatar poses in each frame by processing an avatar animation to which a movement of a user or a pre-registered motion is applied.

The virtual clothes processor 126 processes a video in which the animation processed avatar is clothed with virtual clothes and generates a virtual video including the avatar which wears the virtual clothes. Herein, the virtual clothes processor 126 processes clothing the avatar in virtual clothes through a virtual clothes simulation including collision detection between vertices of an avatar and vertices of the virtual clothes and response calculation.

Referring back to FIG. 1, the determination unit 130 determines each composition area of the live video and the virtual video by analyzing the live video and the virtual video. Specifically, the determination unit 130 may identify an area where actual clothes that the user wears are positioned by analyzing the live video and determine an area where virtual clothes that an avatar wears are positioned by analyzing the virtual video. In addition, the determination unit 130 may determine a composition area of the live video and a composition area of the virtual video by analyzing the areas where the actual clothes and the virtual clothes are positioned.

Figure 3:
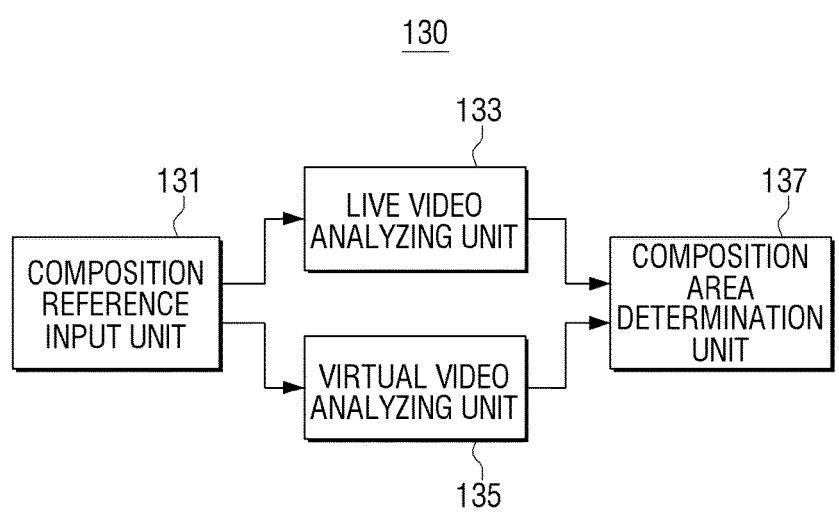
FIG. 3 is a block diagram illustrating a configuration of a determination unit according to an exemplary embodiment.

Detailed explanations regarding the determination unit 130 will be described in more detail with reference to FIG. 3 hereinafter. FIG. 3 illustrates that the determination unit 130 includes a composition reference input unit 131, a live video analyzing unit 133, a virtual video analyzing unit 135 and a composition area determination unit 137.

The composition reference input unit 131 receives a user command to preferentially compose a virtual video or a live video. Specifically, if a user wishes to try one of actual accessories or one of virtual accessories, the composition reference input unit 131 may receive a user command to select the one of actual accessories or the one of virtual accessories.

The live video analyzing unit 133 identifies an area where actual clothes that the user actually wears are pointed by analyzing the live video. Specifically, the live video analyzing unit 133 may separate the area where the actual clothes that the user actually wears are positioned from an area where the actual clothes are not positioned by analyzing the live video.

The virtual video analyzing unit 135 determines an area where virtual clothes that an avatar wears are positioned by analyzing the virtual video. Specifically, the virtual video analyzing unit 135 may separate the area where the virtual clothes that the avatar wears are positioned from an area where the virtual clothes are not positioned by analyzing the virtual video.

The composition area determination unit 137 may determine a composition area of the live video and a composition area of the virtual video by analyzing the areas where the actual clothes and the virtual clothes are positioned. Specifically, the composition area determination unit 137 may, as shown in below [Table 1], determine the area where the actual clothes are positioned as a composition area of the virtual video, determine the area where the virtual clothes are positioned among areas where the actual clothes are not positioned as a composition area of the virtual video, and determine an area where the actual clothes and the virtual clothes are not positioned as a composition area of the live video.

TABLE 1

|  | Area where actual clothes are positioned | Area where the actual clothes are not positioned |
| --- | --- | --- |
| Area where virtual clothes are positioned | Using a virtual video as a composition area | Using the virtual video as a composition area |
| Area where the virtual clothes are not positioned | Using the virtual video as a composition area | Using a live video as a composition area |

In other words, the composition area determination unit 137 may determine an area where virtual clothes or actual clothes are positioned as a composition area of the virtual video, and may determine an area where neither virtual clothes nor actual clothes are positioned are positioned as a composition area of the live video.

In addition, the composition area determination unit 137 may determine a composition area based on the one of actual accessories or the one of virtual accessories which is selected through the composition reference input unit 131. Specifically, in response to the one of actual accessories being selected through the composition reference input unit 131, the composition area determination unit 137 may determine a certain area including the one of actual accessories as a composition area of the live video. In response to the one of virtual accessories being selected, the composition area determination unit 137 may determine a certain area including the one of virtual accessories as a composition area of the virtual video. The composition area determination unit 137 may determine an area corresponding to one of accessories as a composition area according to a kind of the one of accessories shown in below [Table 2].

TABLE 2

|  | Selecting one of actual accessories | Selecting one of virtual accessories |
| --- | --- | --- |
| Bag | In a live video, areas of both hands are determined as composition areas | In a virtual video, areas of both hands are determined as composition areas |
| Shoes | In a live video, an area of a foot and leg wearing a shoe is determined as a composition area | In a virtual video, an area of a foot and leg wearing a shoe is determined as a composition area |
| Bracelet | In a live video, an area of wrist with a bracelet is determined as a composition area (However, if virtual clothes cover the bracelet, it is notified to a user and then a wrist area in a virtual video is determined as a composition area) | In a virtual video, an area of wrist with a bracelet is determined as a composition area (However, if virtual clothes cover the bracelet, it is notified to a user and then the user may select whether to display the bracelet on the virtual clothes) |
| Necklace | In a live video, an area of neck with a necklace is determined as a composition area (However, if virtual clothes cover the necklace, a neck area in a virtual video is determined as a composition area) | In a virtual video, an area of neck with a necklace is determined as a composition area (However, if virtual clothes cover a necklace, it is notified to a user and then the user may select whether to display the necklace on the virtual clothes) |

Referring back to FIG. 1, the generator 140 generates a virtual fitting video by composing a composition area of a live video and a composition area of a virtual video which are determined by the determination unit 130. Specifically, the generator 140 may separate the live video's composition area which is determined by the determination unit 130 from the live video and may separate the virtual video's composition area which is determined by the determination unit 130 from the virtual video. The generator 140 may obtain boundary information regarding boundary areas of the composition area of the live video and the composition area of the virtual video. Herein, the boundary information is information about a plurality of pixels included in a boundary area which is to be composed in the live video and information about vertices included in a boundary area which is to be composed in the virtual video.

A user in the live video and an avatar in the virtual video should be positioned in the same space to obtain boundary information which is consistent with boundary information of the user in the live video and the avatar in the virtual video. Therefore, the generator 140 may project the avatar in a screen space and match the avatar and the user in the live video to position the avatar and the user in the same space.

The generator 140 may generate a virtual fitting video by composing the composition area of the live video and the composition area of the virtual video based on the separated areas and the obtained boundary information. The generator 140 may compose various virtual spaces such as a party room, an office room, a playground, an outside place or the like as backgrounds of a virtual fitting video in which an avatar and a user are composed.

The outputter 150 outputs the generated virtual fitting video. Specifically, the outputter 150 may display a virtual fitting video in which a user wears virtual clothes on a display.

Hereinafter, how a virtual fitting device provides a virtual fitting video by composing a live video and a virtual video will be described with reference to FIGS. 4A to 4E.

Figure 4A:
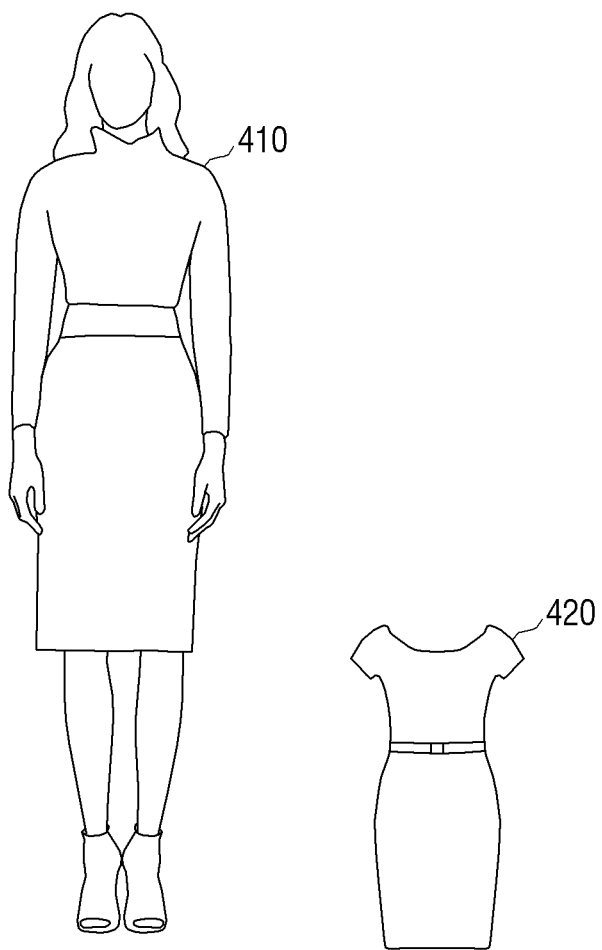
FIGS. 4A to 4E are views illustrating a method of generating a virtual fitting image by composing a live video and a virtual video according to an exemplary embodiment.
Figure 4B:
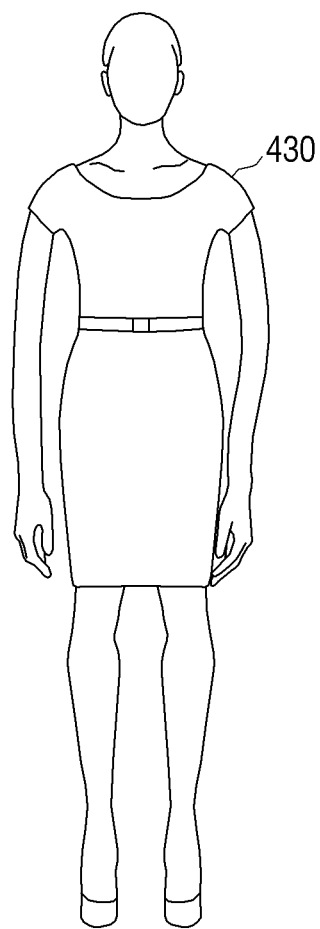

In an exemplary embodiment, if a user wishes to try virtual clothes 420 such as illustrated in FIG. 4A, the live video acquiring unit 110 may acquire a live video 410 including the user as illustrated in FIG. 4A. In addition, as explained with reference to FIG. 2, the virtual video acquiring unit 120 may acquire a virtual video 430 by generating an avatar wearing the virtual clothes 420 as illustrated in FIG. 4B.

Figure 4C:
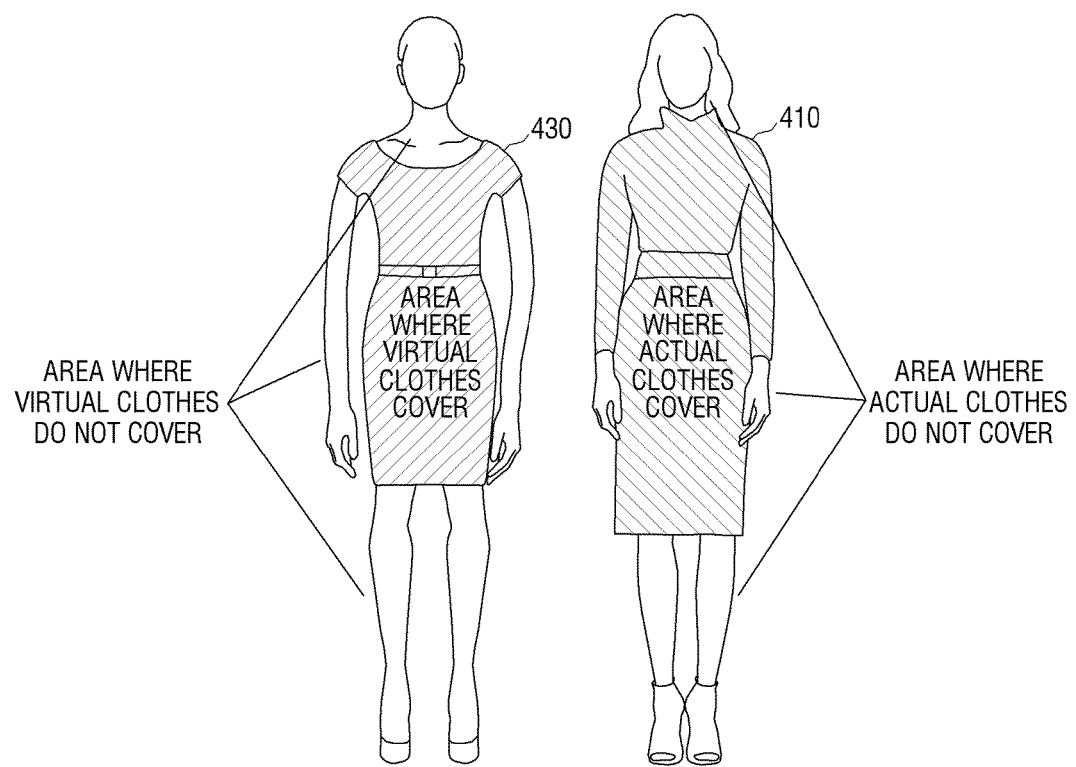

As illustrated in FIG. 4C, the live video analyzing unit 133 may distinguish an area where actual clothes cover and an area where the actual clothes do not cover in a live video 415. As illustrated in FIG. 4C, the virtual video analyzing unit 135 may distinguish an area where virtual clothes cover and an area where the virtual clothes do not cover in a virtual video 435.

Figure 4D:
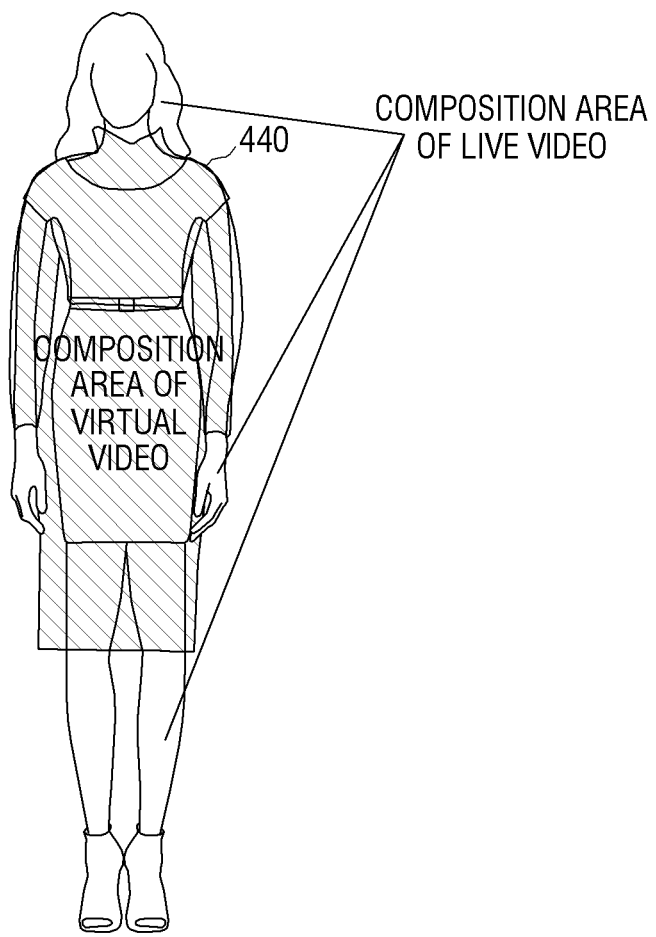

As explained in [Table 1], the composition area determination unit 137 may determine an area where the actual clothes or the virtual clothes are positioned as a composition of the virtual video and determine an area where the actual clothes and the virtual clothes are not positioned as a composition area of the live video. Specifically, as illustrated in FIG. 4D, the composition area determination unit 137 may determine a hatch area as a composition area of the virtual video and determine rest of the areas as composition areas of a live video.

Figure 4E:
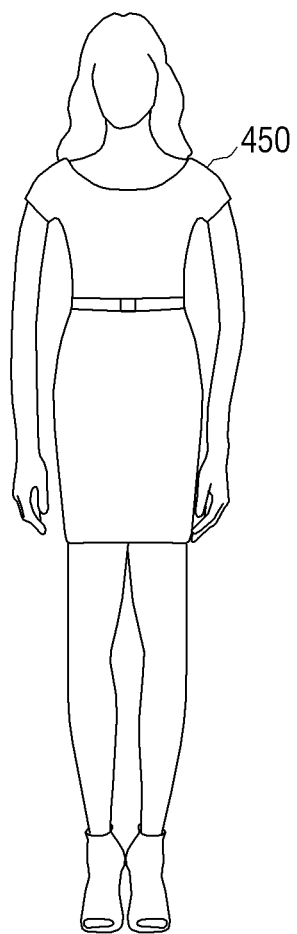

The generator 140 may generate a virtual fitting video 450 as illustrated in FIG. 4E by composing the composition area of the virtual video determined by the composition area determination unit 137 and the composition areas of the live video determined by the composition area determination unit 137.

The outputter 150 may output the virtual fitting video 450 which is generated by the generator 140.

As described the above, a user may be provided with a more substantial and natural virtual fitting video because the provided is the virtual fitting video which is made by a live video and a virtual video being composed.

Figure 5:
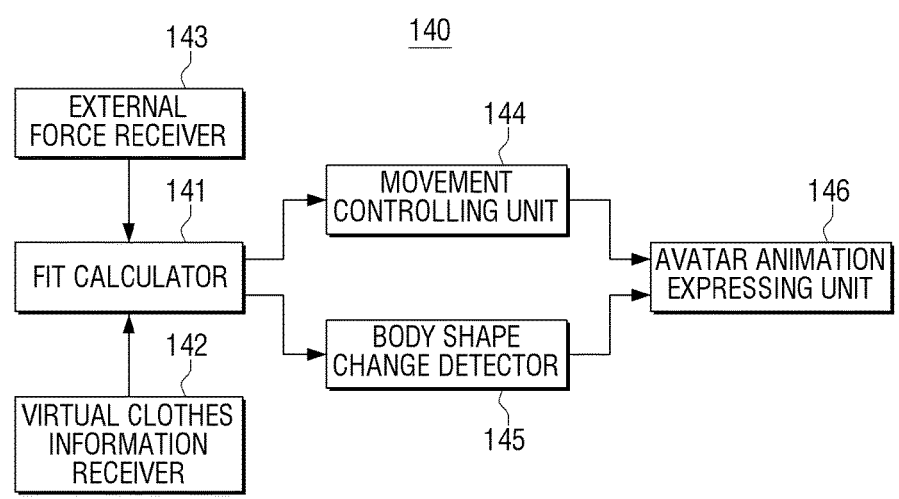
FIG. 5 is a block diagram illustrating a configuration of a generator according to an exemplary embodiment.

Meanwhile, the generator 140 may provide a virtual fitting video with fitting feeling by using clothing characteristic information or information regarding external force. FIG. 5 is a block diagram illustrating a configuration of the generator 140 for generating a virtual fitting video which provides fitting feeling according to an exemplary embodiment. FIG. 5 illustrates that the generator 140 includes a fit calculator 141, a virtual clothes information receiver 142, external force receiver 143, a movement controlling unit 144, a body shape change detector 145 and an avatar animation expressing unit 146.

The fit calculator 141 calculates an extent how much virtual clothes fit when a user wears the virtual clothes based the result of processing the virtual clothes and characteristic information of the virtual clothes. Specifically, the fit calculator 141 may calculate an extent how much the virtual clothes fit by determining a position where the virtual clothes are stretched and an extent of stretchiness of the virtual clothes by calculating the distances between vertices of an avatar and vertices of the virtual clothes based on the characteristic of the virtual clothes.

The virtual clothes information receiver 142 provides characteristic information regarding virtual clothes to calculate an extent how much the virtual clothes fit. Herein, the characteristic information of the virtual clothes may include characteristic information which fabric of the virtual clothes has such as how much well the virtual clothes stretch, how the fabric feels, the weight of the virtual clothes and the like. In addition, the characteristic information of the virtual clothes may include information about a size of the virtual clothes, a part which is sewed, how the part were sewed and what kind of thread is used, etc.

The external force receiver 143 may receive information regarding external force which is provided with an avatar and virtual clothes. Herein, the information regarding external force may be information regarding wind such as a direction in which the wind blows, an extent of the wind and the like.

The movement controlling unit 144 controls a movement of an avatar according to an extent of how much virtual clothes fit which is calculated by the fit calculator 141. Specifically, if an extent of stretchiness of the virtual clothes is equal to or greater than a predetermined threshold value, the movement controlling unit 144 may stop a movement of the avatar or control the speed of the movement of the avatar and if the extent of stretchiness of the virtual clothes is less than the predetermined threshold value, the movement controlling unit 144 may control a movement of the avatar to correspond to a movement of the user. Herein, the predetermined threshold value may be one value or a certain range.

The body shape change detector 145 may detect a body shape change of the user according to a movement of the user. Specifically, in response to a body shape change of the user according to a movement of the user, the body shape change detector 145 may detect the user's body shape change. For example, if the user sits and the belly comes out on his/her side, the body shape change detector 145 may detect the change of the user's belly.

The avatar animation expressing unit 146 may animate the avatar based on a movement and a body shape change of the avatar which are determined by the movement controlling unit 144 and the body shape change detector 145. Specifically, the avatar animation expressing unit 146 may perform an animation processing (for example, processing with another color) on an area of which an extent how much virtual clothes fit is equal or greater than a predetermined value based on a movement and a body shape change of the user. In addition, the avatar animation expressing unit 146 may display a main point that the virtual clothes target and a main point of the virtual clothes that the current avatar wears. In addition, the avatar animation expressing unit 146 may translucently display the virtual clothes according to a selection of the user.

Hereinafter, various exemplary embodiments of the present invention are explained with reference to FIGS. 6A to 9B.

Figure 6A:
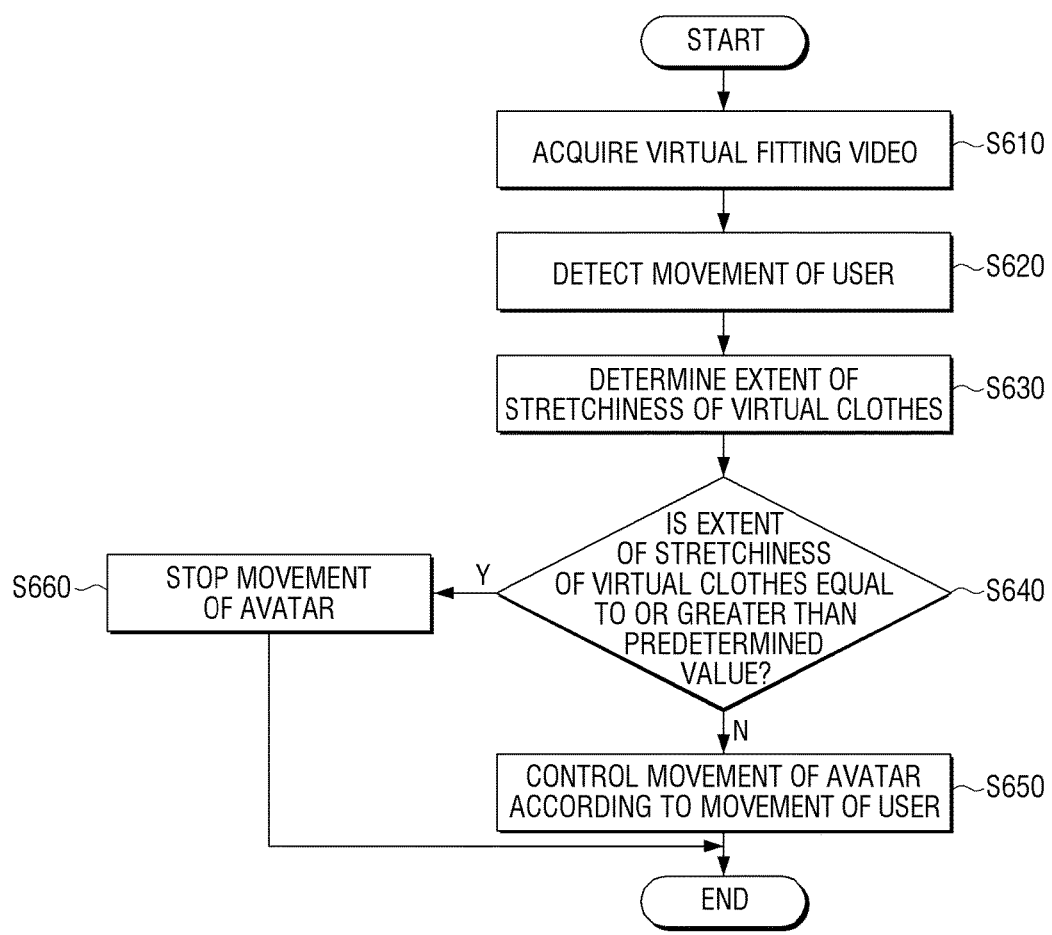

FIG. 6A is a flowchart illustrating an example of controlling a movement of an avatar according to how much virtual clothes fit according to an exemplary embodiment.

At operation S610, the virtual fitting device 100 acquires a virtual fitting video. Herein, the virtual fitting device 100 may acquire a virtual fitting video by composing a composition area of a live video and a composition area of a virtual video. The virtual fitting video may include an avatar which is made by composing the composition area of live video and the composition area of virtual video.

The virtual fitting device 100 may detect a movement of a user at operation S620.

The virtual fitting device 100 determines an extent of stretchiness of virtual clothes with respect to the movement of the user based on characteristic information of the virtual clothes at operation S630. For example, if the user raises his/her hand, the virtual fitting device 100 may determine an extent of stretchiness of shoulder part of the virtual clothes with respect to the user raising his/her hand based on the characteristic information of the virtual clothes.

The virtual fitting device 100 may determine whether the extent of stretchiness of the virtual clothes is equal to or greater than a predetermined value at operation S640.

If the extent of stretchiness of virtual clothes is equal to or greater than the predetermined value (S640—Y), the virtual fitting device 100 stops the movement of an avatar included in the virtual fitting video at operation S660. Specifically, if the extent of stretchiness of the virtual clothes according to the movement of the user is equal to or greater than the predetermined value (S640—Y), the virtual fitting device 100 may determine that the virtual clothes are tight for the avatar according to the movement of the user and may gradually decrease the moving speed on the tight part of the virtual clothes and stop the movement on the tight part of the virtual clothes. In other words, if it is determined that virtual clothes are tight for the avatar according to a movement of a user, even though the user moves, the virtual fitting device 100 may strop the movement of the avatar by displaying a previous frame.

Herein, the virtual fitting device 100 may display a different movement of the avatar according to a user input. For example, the virtual fitting device 100 may generate a virtual fitting video by overlapping a video in which the avatar stops a movement which corresponds to the movement of the user and a video in which the movement of the user is reflected on the avatar.

If the extent of stretchiness of the virtual clothes is less than the predetermined value (S640—N), the virtual fitting device 100 controls a movement of the avatar to correspond to a movement of the user at operation S650.

Figure 6B:
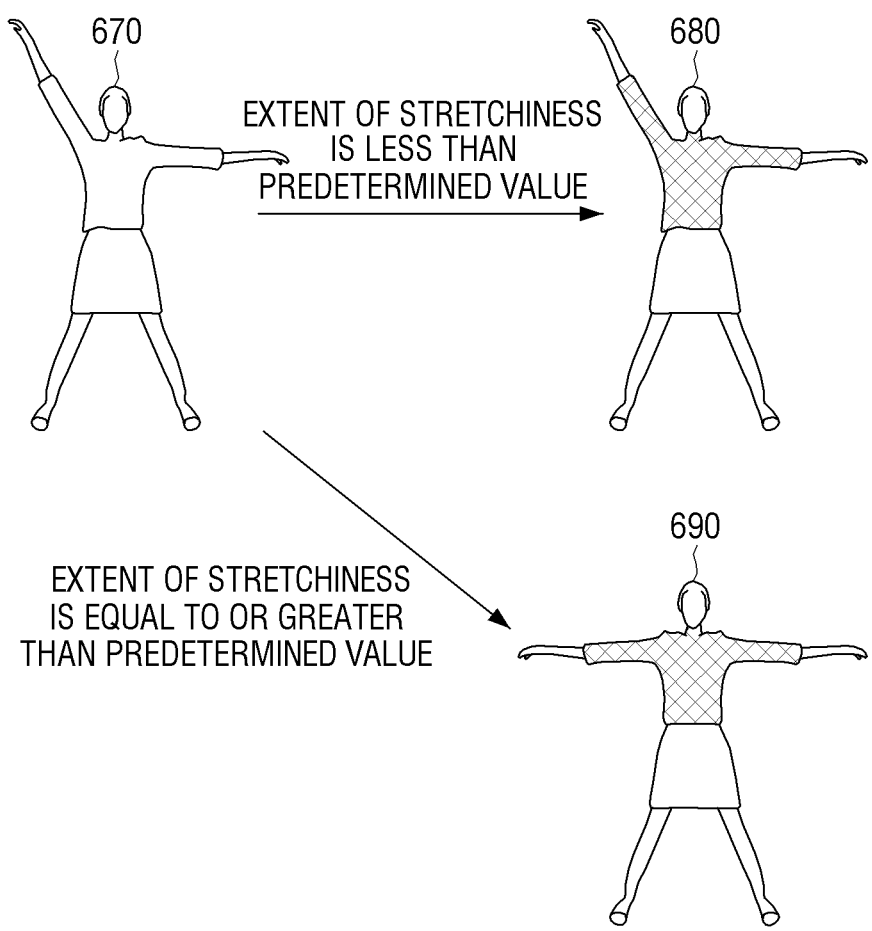

For example, as illustrated in the left side of FIG. 6B, when an actual user 640 raises his/her right hand, if it is determined that the right shoulder part of the virtual clothes is stretched equal to or greater than a predetermined value, the virtual fitting device 100 may control the movement of an avatar 690 as illustrated in the lower right side. However, if it is determined that the right shoulder part of the virtual clothes is stretched less than the predetermined value according to the user raising his/her right hand, the virtual fitting device 100 may control a movement of an avatar 680 to correspond to the movement of the user as illustrated in the upper right side.

As illustrated in the above, a user may check how much clothes would fit according to his/her own movement because a movement of an avatar is controlled and limited by the calculated extent of the clothes stretchiness according to the movement of the user.

Figure 7A:
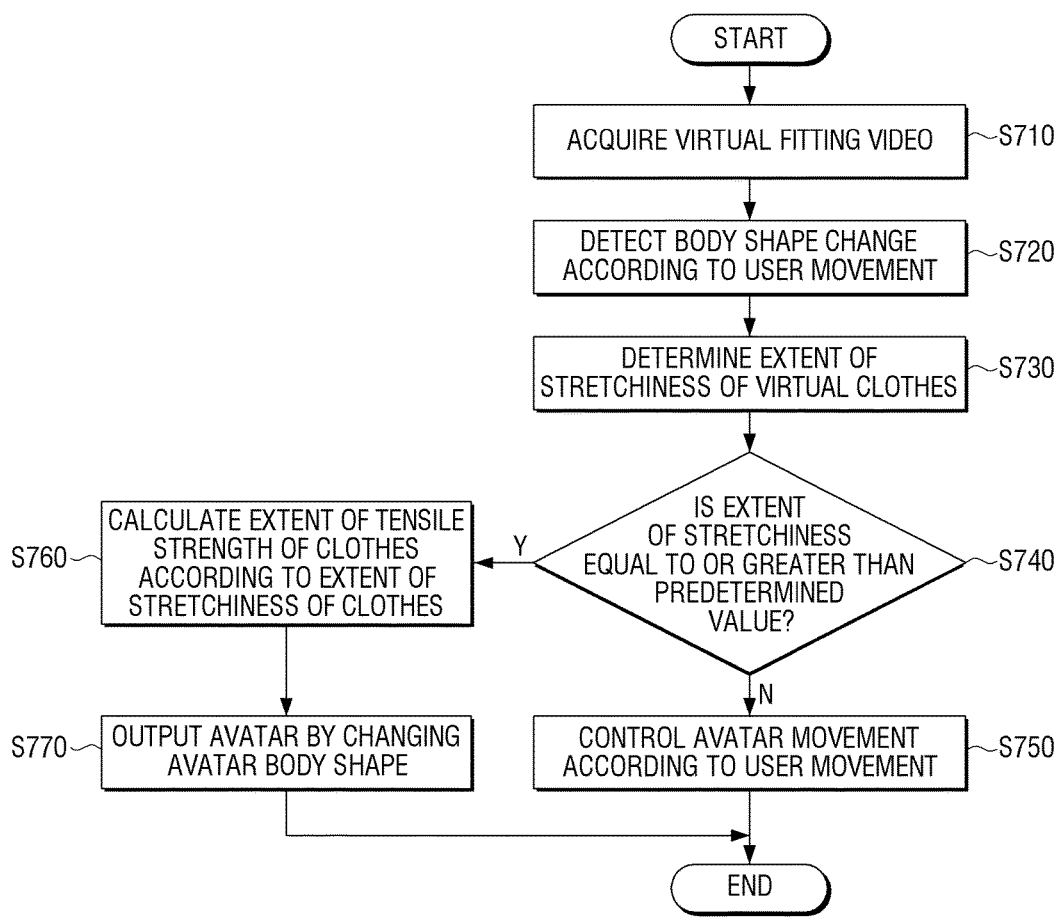

FIG. 7A is a flowchart illustrating a method of reflecting a body shape change of a user according to a movement of the user to an avatar according to an exemplary embodiment.

The virtual fitting device 100 acquires a virtual fitting video at operation S710. Herein the virtual fitting device 100 may acquire the virtual fitting video by composing a composition area of a live video and a composition area of a virtual video. Herein, the virtual fitting video may include an avatar which is made by composing the composition area of the live video and the composition area of the virtual video.

The virtual fitting device 100 may detect a body shape change according to a movement of the user at operation S720. For example, the virtual fitting device 100 detects whether the belly of the user comes out on his/her side when the user sits.

The virtual fitting device 100 determines an extent of stretchiness of virtual clothes based on characteristic information of the virtual clothes and an extent of change on a body shape at operation S730.

The virtual fitting device 100 determines whether the extent of stretchiness of the virtual clothes is equal to or greater than a predetermined value at operation S740.

If the extent of stretchiness of the virtual clothes is equal to or greater than the predetermined value (S740—Y), the virtual fitting device 100 calculates an extent of tensile strength of the virtual clothes at operation S760 and then, the virtual fitting device 100 changes a body shape of the avatar based on the extent of tensile strength of the virtual clothes and body information and outputs the avatar at operation S770. Specifically, the virtual fitting device 100 may adjust a position of an avatar by moving a position of a vertex composing an avatar in at least one direction among an inner direction, an outer direction, an upper direction and a lower direction according to the extent of tensile strength of the virtual clothes. Herein, regarding body characteristic information, a body shape change of the avatar may be determined with respect to a point where may be easily changed or a point where may not be easily changed by an extent of tensile strength of clothes because of bones or flesh, etc.

Meanwhile, the virtual fitting device 100 may display the part on which body shape of the user is changed distinctively from the rest of the parts. For example, the virtual fitting device 100 may display the part on which the body shape of the user is changed with color different from the color of the rest of the parts.

However, if the extent of stretchiness of the virtual clothes is less than the predetermined value (S740—N), the virtual fitting device 100 controls a movement of the avatar according to a movement of the user at operation S750.

Figure 7B:
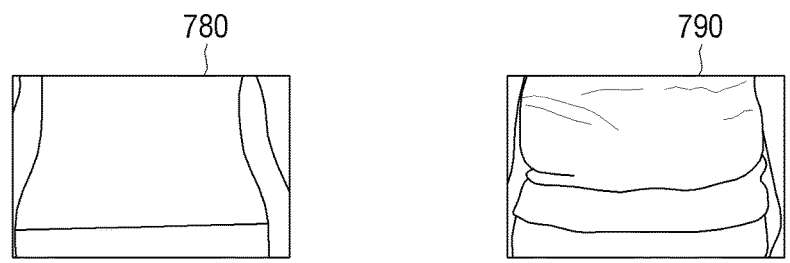

For example, if the user sits and the extent of stretchiness of the virtual clothes is less than the predetermined value, the virtual fitting device 100 may output the avatar without changing a body shape of the avatar as illustrated in the left side of FIG. 7B but if the extent of stretchiness of the virtual clothes is equal to or greater than the predetermined value, the virtual fitting device 100 may output the avatar by reflecting a body shape change to the avatar (for example, belly coming out) as illustrated in the left side of FIG. 7B.

As described in the above, a user may determine which part of the virtual clothes is tight by detecting a body shape change according to a movement of the user.

FIG. 8 is a flowchart illustrating a method of processing a virtual fitting device according to information regarding external force according to an exemplary embodiment.

The virtual fitting device 100 acquires a virtual fitting video at operation S810. Herein, the virtual fitting device 100 may acquire the virtual fitting video by composing a composition area of a live video and a composition area of a virtual video. The virtual fitting video may include an avatar which is made by composing the composition area of the live video and the composition area of the virtual video.

The virtual fitting device 100 receives information regarding external force at operation S820. Herein, the information regarding external force may be wind information such as a wind direction, the strength of wind and the like.

The virtual fitting device 100 processes virtual clothes by reflecting the information regarding external force at operation S830. Specifically, the virtual fitting device 100 may compare a position of a vertex when the external force is applied and a position of a vertex when the external force is not applied. The virtual fitting device 100 may determine that the greater a distance between two vertices is, the more the virtual clothes flap and the shorter a distance between two vertices is, the softer the virtual clothes flap.

The virtual fitting device 100 outputs a virtual fitting video in which the information regarding the external force is applied at operation S840. Herein, the virtual fitting device 100 may display a flapping part differently from another part in order for the user to check the flapping part more intuitively.

As described the above, a user may check fitting feeling of virtual clothes in response to an external circumstance by applying external force in a virtual fitting video.

Figure 9A:
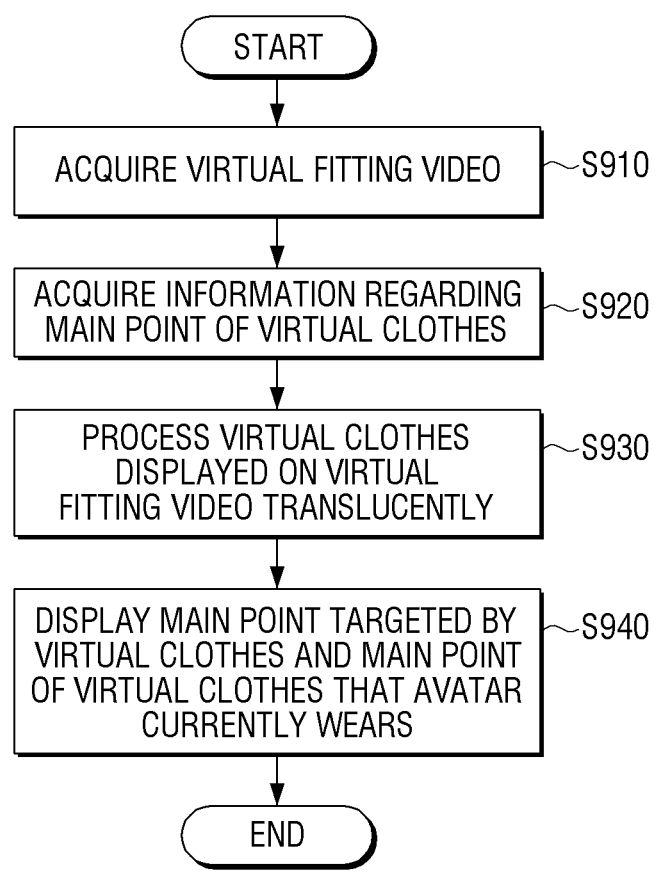

FIG. 9A is a flowchart illustrating an example of displaying a main point of virtual clothes according to an exemplary embodiment.

The virtual fitting device 100 acquires a virtual fitting video at operation S910.

The virtual fitting device 100 acquires information regarding a main point of virtual clothes at operation S920. Herein, if a virtual top is tried on, a main point of the top may be a sewed shoulder line, an end part of a sleeve, etc. and if bottoms are tried on, a main point of the bottoms may be an end part of a leg, etc.

The virtual fitting device 100 processes the virtual clothes to be translucently displayed in a virtual fitting video at operation S930.

Figure 9B:
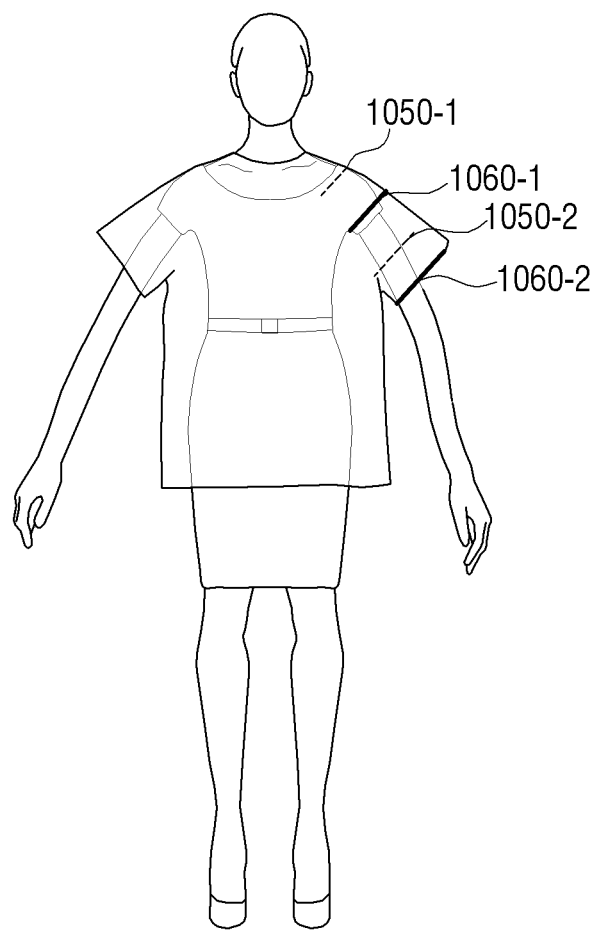

The virtual fitting device 100 displays a main point that virtual clothes target and a main point of the virtual clothes that an avatar currently wears at operation S940. Specifically, as illustrated in FIG. 9B, the virtual fitting device 100 may display a shoulder line 1050-1 and a sleeve ending line 1050-2 that the virtual clothes target as dotted lines and a shoulder line 1060-1 and a sleeve ending line 1060-2 of the virtual clothes that the avatar currently wears as solid lines. However, the virtual fitting device 100 displaying the main points targeted by the virtual clothes as dotted lines and displaying the main points of the virtual clothes that the avatar currently wears as solid lines only pertain to an exemplary embodiment. A main point that virtual clothes target may be differently displayed from a main point of the virtual clothes that an avatar currently wears by another method (for example, color, transparency, etc.).

As described the above, a user may more intuitively check whether virtual clothes fit himself/herself by displaying a main point that the virtual clothes target and a main point of the virtual clothes that an avatar currently wears.

FIG. 10 is a flowchart illustrating a virtual fitting method of the virtual device 100 according to an exemplary embodiment.

The virtual fitting device 100 acquires a live video by photographing a user at operation S1010.

The virtual fitting device 100 acquires a virtual video including an avatar which is generated based on a body shape and a movement of the user at operation S1020. Herein, virtual clothes that the user wishes to try may be tried on the avatar.

The virtual fitting device 100 may determine each composition area of the live video and the virtual video by analyzing the live video and the virtual video at operation S1030. Specifically, the virtual fitting device 100 may identify an area where actual clothes that the user actually wears are positioned by analyzing the live video, determine an area where the virtual clothes that the avatar wears are positioned by analyzing the virtual video, and determine each composition area of the live video and the virtual video by comparing the area where the actual clothes are positioned and the area where the virtual clothes are positioned. Herein, the virtual fitting device 100 may determine an area where the actual clothes or the virtual clothes are positioned as a composition area of the virtual video and determine an area where neither the actual clothes nor the virtual clothes are positioned as a composition area of the live video.

The virtual fitting device 100 may generate a virtual fitting video by composing the composition area of the live video and the composition area of the virtual video at operation S1040. Herein, the virtual fitting device 100 may generate a virtual fitting video by reflecting characteristic information of the virtual clothes or information regarding external force.

The virtual fitting device 100 outputs the virtual fitting video at operation S1050.

According to the above described exemplary embodiments, a user may select clothes which fit himself/herself by experiencing a virtual fitting with fitting feeling without the user actually trying the clothes on.

Meanwhile, a video processing method of a video processing device according to the various exemplary embodiments may be embodied as a program and then stored on various types of recording media. In particular, a program including the controlling method of a display apparatus may be stored and provided in a non-transitory computer readable medium.

The non-transitory computer-readable medium is a medium which does not store data temporarily such as a register, cache, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A virtual fitting method, comprising:
acquiring a live video obtained by photographing a user;
acquiring a virtual video which includes an avatar corresponding to the user based on a body shape of the user and a movement of the user;
determining each composition area of the live video and the virtual video by analyzing the live video and the virtual video; and
composing the composition area of the live video and the composition area of the virtual video to generate a virtual fitting video; and
outputting the virtual fitting video,
wherein the determining comprises:
determining an area in which actual clothes worn by the user are located from the live video and an area in which virtual clothes worn by the avatar are located from the virtual video;
determining an area excluding the area in which the actual clothes are located and an area corresponding to the area in which the virtual clothes are located from the live video as the composition area of the live video; and determining an area excluding an area corresponding to the composition area of the live video as the composition area of the virtual video.

2. The method as claimed in claim 1, further comprising determining an area where the actual clothes are positioned to be part of the composition area of the virtual video, determining an area where the virtual clothes are positioned among areas where the actual clothes are not positioned to be part of the composition area of the virtual video, and determining an area where the actual clothes and the virtual clothes are not positioned to be the composition area of the live video.

3. The method as claimed in claim 1, further comprising:
receiving input for selecting one of actual accessories or one of virtual accessories; and
in response to one of actual accessories being selected, determining a certain area which includes an area where the one of actual accessories is positioned as at least a part of the composition area of the live video and, in response to one of virtual accessories being selected, determining a certain area which includes an area where the one of virtual accessories is positioned as at least a part of the composition area of the virtual video.

4. The method as claimed in claim 1, wherein acquiring the live video comprises acquiring the live video by photographing the user by using a video camera, and
wherein acquiring the virtual video comprises photographing the body shape and the movement of the user by using a depth camera or a video camera and generating an avatar based on the photographed body shape and the photographed movement of the user.

5. The method as claimed in claim 1, wherein the virtual fitting video reflects characteristic information of virtual clothes.

6. The method as claimed in claim 5, further comprising:
in response to a movement of the user, determining an extent of stretchiness of the virtual clothes with respect to the movement of the user based on the characteristic information of the virtual clothes; and
in response to the extent of stretchiness of the virtual clothes being equal to or greater than a threshold value, stopping a movement of a user image which is included in the virtual fitting video or controlling a speed of the movement of the user image.

7. The method as claimed in claim 5, further comprising:
in response to a movement of the user, determining a body shape change of the user; and
generating the virtual fitting video based on the characteristic information of the virtual clothes and the body shape change of the user.

8. The method as claimed in claim 5, further comprising:
receiving information regarding external force; and
generating the virtual fitting video based on the characteristic information of the virtual clothes and the information regarding external force.

9. The method as claimed in claim 5, wherein the virtual fitting video displays a main point of the virtual clothes based on information regarding the main point of the virtual clothes.

10. A virtual fitting device, comprising a processor configured to:
acquire a live video of a user obtained by photographing the user;
acquire a virtual video including an avatar corresponding to the user based on a body shape of the user and a movement of the user;
determine each composition area of the live video and the virtual video by analyzing the live video and the virtual video;
compose the composition area of the live video and the composition area of the virtual video to generate a virtual fitting video; and
output the virtual fitting video,
wherein the determining of each composition area comprises:
determining an area in which actual clothes worn by the user are located from the live video and an area in which virtual clothes worn by the avatar are located from the virtual video;
determining an area excluding the area in which the actual clothes are located and an area corresponding to the area in which the virtual clothes are located from the live video as a composition area of the live video; and
determining an area excluding an area corresponding to the composition area of the live video as a composition area of the virtual video.

11. The device as claimed in claim 10, wherein the processor is configured to determine an area where the actual clothes are positioned to be part of the composition area of the virtual video, determine an area where the virtual clothes are positioned among areas where the actual clothes are not positioned to be part of the composition area of the virtual video, and determine an area where the actual clothes and the virtual clothes are not positioned to be the composition area of the live video.

12. The device as claimed in claim 10, further comprises:
a receiver configured to receive input for selecting one of actual accessories or one of virtual accessories,
wherein the processor is configured to, in response to one of actual accessories being selected, determine a certain area which includes an area where the one of actual accessories is positioned as at least a part of the composition area of the live video and, in response to one of virtual accessories being selected, determine a certain area which includes an area where the one of virtual accessories is positioned as at least a part of the composition area of the virtual video.

13. The device as claimed in claim 10, wherein the live video is obtained by photographing the user by using a video camera, and
wherein acquiring the virtual video comprises photographing the body shape and the movement of the user by using a depth camera or a video camera and generating an avatar based on the photographed body shape and the photographed movement of the user.

* * * * *